No. 662,211. Patented Nov. 20, 1900.
J. A. WIEDERSHEIM.
APPARATUS FOR FILTERING OR PURIFYING AND AERATING WATER.
(Application filed Sept. 13, 1900.)
(No Model.) 3 Sheets—Sheet 1.
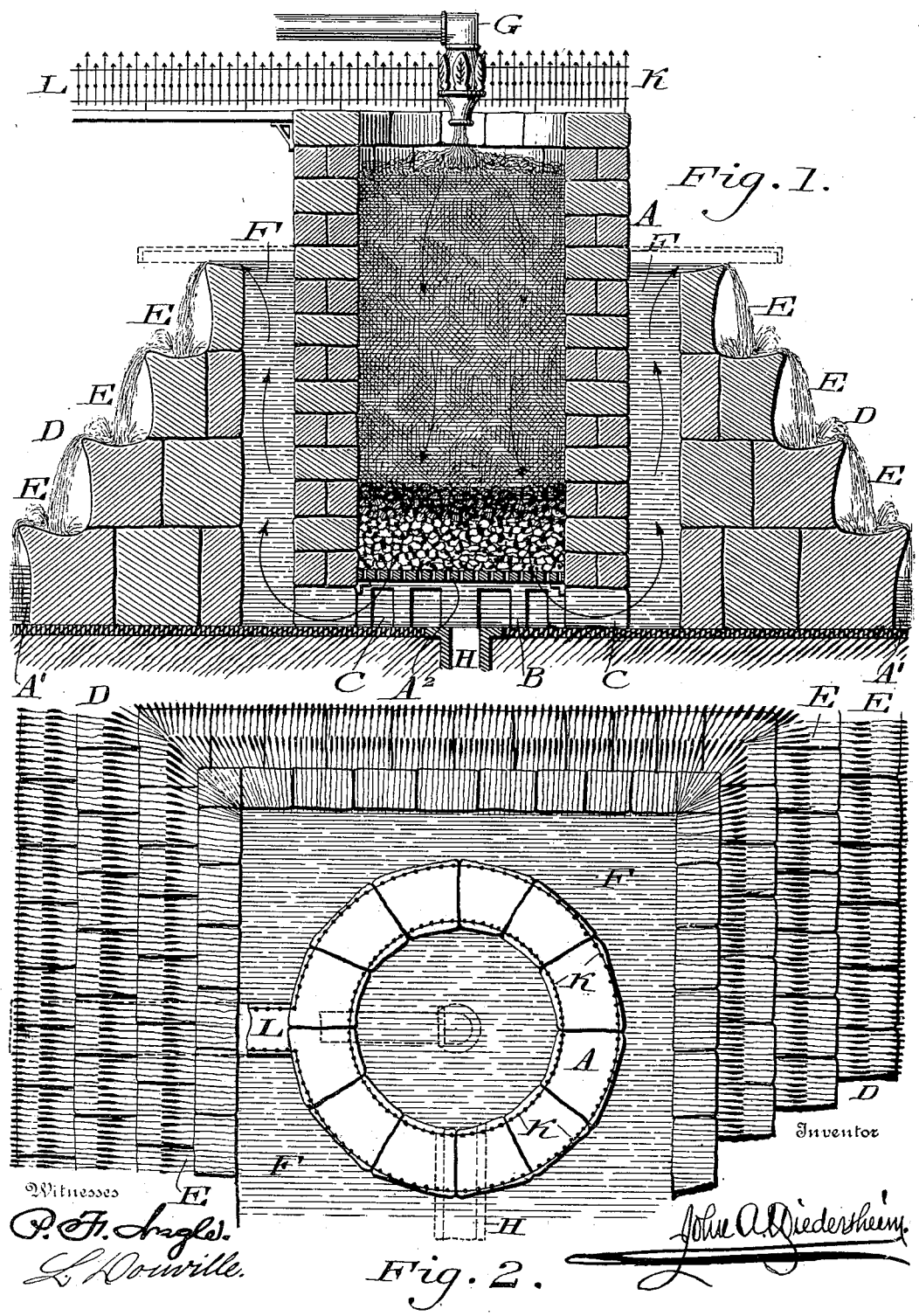

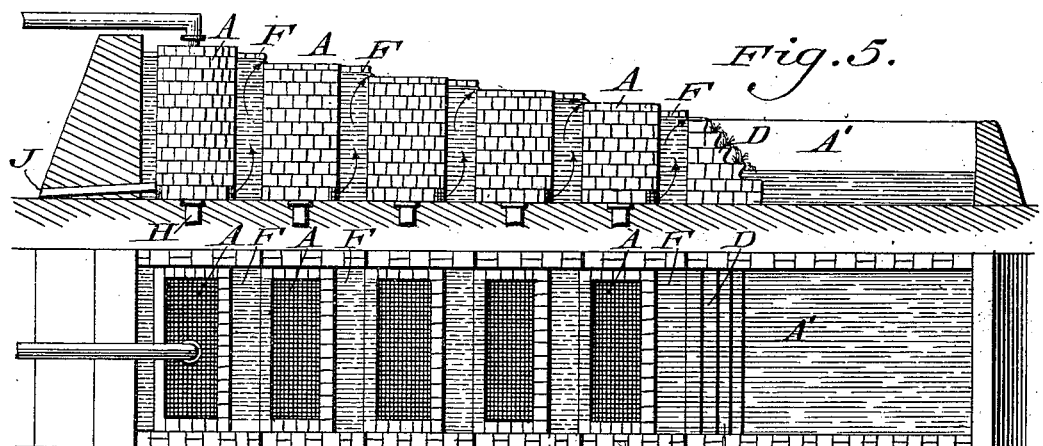
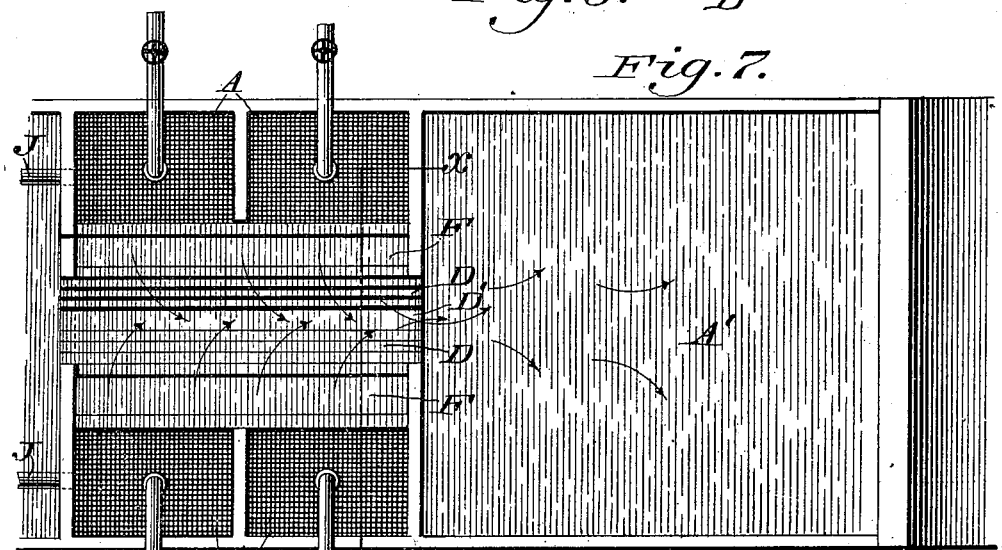
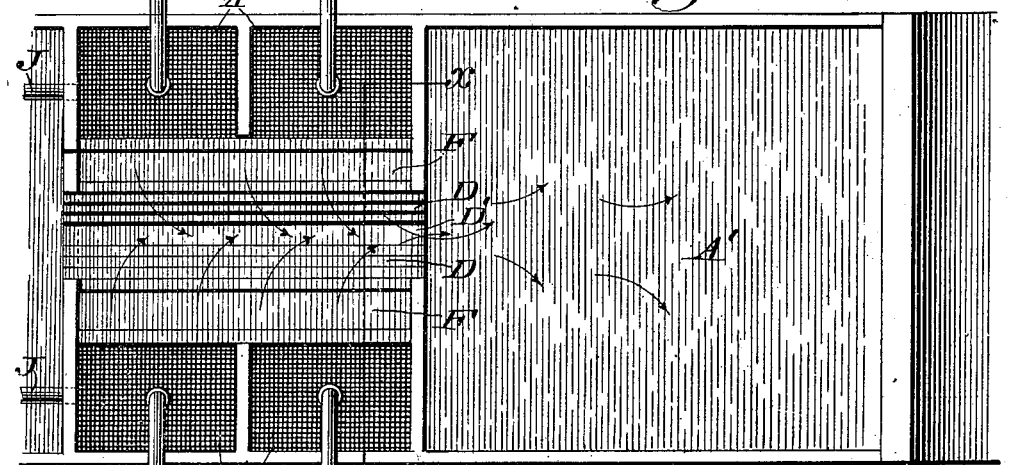
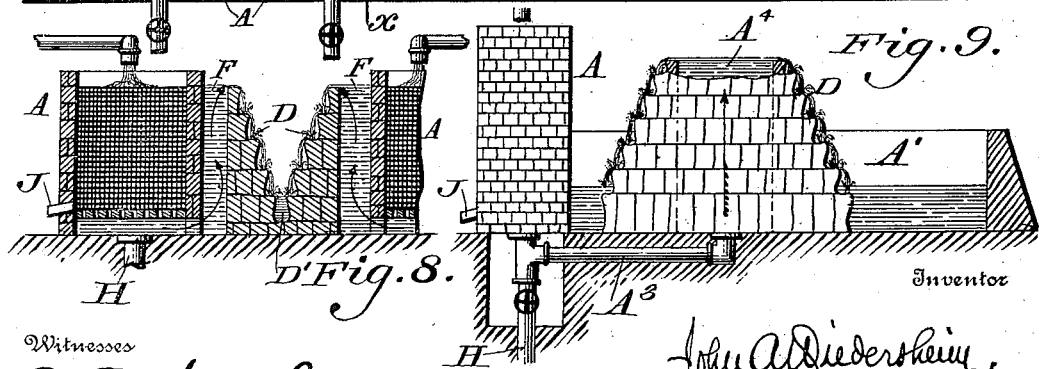

UNITED STATES PATENT OFFICE.

JOHN A. WIEDERSHEIM, OF PHILADELPHIA, PENNSYLVANIA.

APPARATUS FOR FILTERING OR PURIFYING AND AERATING WATER.

SPECIFICATION forming part of Letters Patent No. 662,211, dated November 20, 1900.

Application filed September 13, 1900. Serial No. 29,883. (No model.)

*To all whom it may concern:*

Be it known that I, JOHN A. WIEDERSHEIM, a citizen of the United States, residing in the city and county of Philadelphia, State of Pennsylvania, have invented a new and useful Improvement in Apparatus for Filtering or Purifying and Aerating Water, of which the following is a specification.

My invention consists of an apparatus for filtering or purifying and aerating water involving means for passing unfiltered water through a suitable bed, a well for collecting and elevating the filtered or purified water, and means for aerating the latter, said well being located between the filtering vessel and the aerating device, whose walls are utilized to form said well. Provision is also made for emptying the filtering vessel and removing the deposits or collected impurities, and means are employed for discharging the sand or filtering material by flowing it from the filtering vessel.

It also consists of details of construction, as will be hereinafter set forth.

Figure 3:
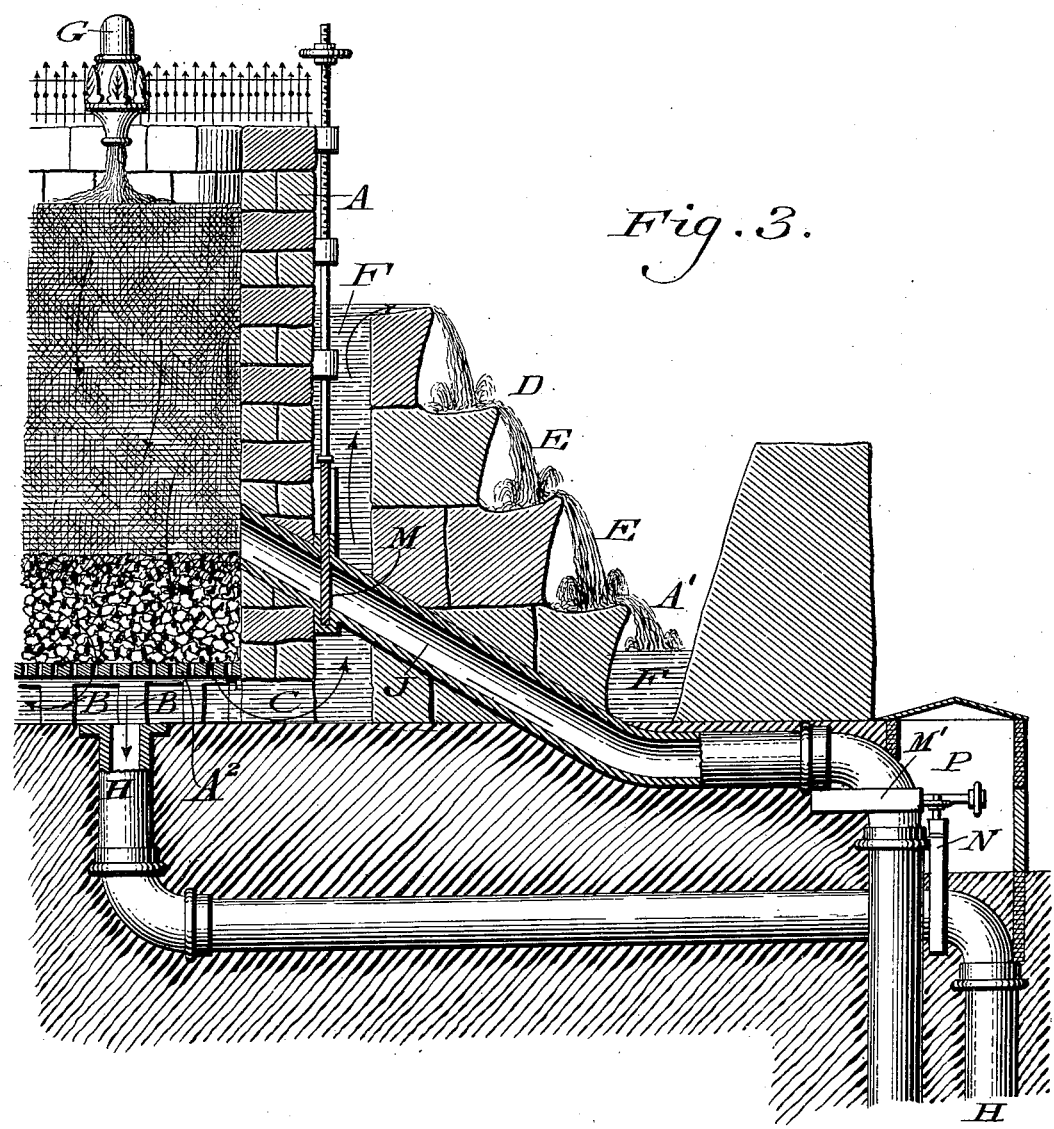
Figure 4:
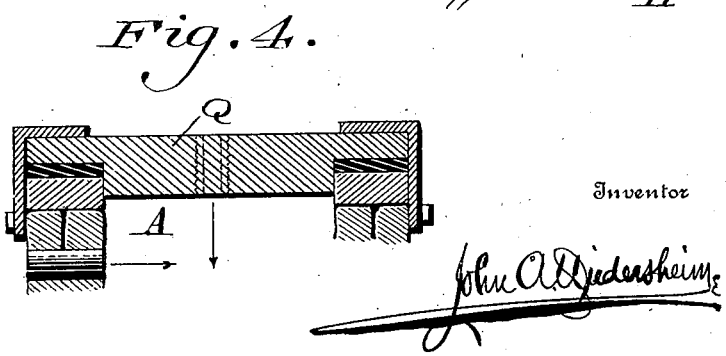

Figures 1 and 3 represent vertical sections at a right angle to each other of an apparatus for filtering or purifying and aerating water embodying my invention. Fig. 2 represents a top or plan view thereof. Fig. 4 represents a section of a portion of the filtering vessel with a closing cap or cover thereon. Fig. 5 represents a side elevation of the apparatus in multiplied form. Fig. 6 represents a top view thereof. Fig. 7 represents a top or plan view of another form of the apparatus, showing a plurality of members. Fig. 8 represents a vertical section thereof on line $x$ $x$, Fig. 7. Fig. 9 represents a side elevation of another form of my invention.

Similar letters of reference indicate corresponding parts in the figures.

Referring to the drawings, A designates a chamber or vessel formed of a cylindrical or other shaped body and containing filter-bed of sand or other suitable material or a combination of such materials.

B designates the base on which the vessel A is supported, the same having openings or ports C therein, providing the outlet for filtered water from the vessel A.

D designates the aerator, consisting of a wall whose outer surface is of the form of terraces or steps E, said wall being around the vessel A, there existing a chamber between the said vessel and wall which forms the well F for filtered water, the same being in communication below with said vessel by the ports C and above with the atmosphere.

G designates a pipe for supplying the vessel A with unfiltered water.

H designates a discharge-pipe leading from the space within the base B.

J designates a discharge-pipe leading from the side of the vessel A above the bottom thereof.

On the top of the wall of the vessel A are the railings K for guard purposes, and leading to said top is the bridge L, whereby said top may be conveniently reached.

In the pipe J is the valve M, which is adapted to be operated from the top of the vessel A, so as to open and close said pipe.

In the pipe H is the valve N, which is adapted to be operated in the house or shed P, so as to open and close said pipe.

The pipe J has also a valve M', which is adapted to be operated in said house or shed P for the same purpose as the valve M; but the employment of both valves M M' may not be essential.

The operation is as follows: The unfiltered water is admitted into the vessel A, and it passes through the bed therein, whereby it is filtered, it being also evident that it may be subjected to any coagulent or other material placed in the filter-bed or other suitable part of the vessel A or the plant for purifying purposes usual in such cases. The filtered or filtered and purified water leaves the vessel A and passes through the ports C into the well F, in which it rises and from the top of which it overflows while exposed to the atmosphere and falls over the steps E, where the streams of the water are agitated or broken and aeration of the same effected, in which condition it is directed into the storage basin or reservoir A'. In order to remove the deposits or impurities, the valve N of the pipe H is opened and the valve M of the pipe J closed. The water will then flow through the vessel A into said pipe H and take with it by the suction of said pipe any deposit or collected impurities in the lower part of the vessel A and the space below the bottom or supporting diaphragm A² at the bottom of the filter-bed. The well F may be emptied of its contents through said pipe H, said contents leaving the base of said well and entering the space at the bottom of the vessel A, with which said pipe is in communication, and so reaching said pipe, it being evident that the water in said well while discharging may join that discharged from said vessel, thus effectively washing out said space and the base of the well of any deposits or impurities therein. This action may be assisted by opening the pipe J, when the deposit or collected impurities on the broken stone, coke, or other material employed for supporting the sand or upper substance of the filter-bed will enter said pipe J and so be directed out of the vessel A, and the sand or substance may follow the same when removal thereof is desired, in which case the water admitted by the pipe G may be turned on to a greater extent or an agitator applied, so as to loosen the sand or substance and make it capable of escaping by flowing through said pipe J, when it may be directed elsewhere, collected, washed, and dried, so as to be capable of reuse in the vessel A, it being, however, evident that the filter-bed may be removed at the open top of the vessel A.

When it is desired to have the vessel A closed at top, a cover or cap, such as Q, may be fitted on the same, as shown in Fig. 4. In this case an opening may be formed in said cap or in the side of the vessel for the admission of the unfiltered water to the vessel.

In Figs. 5 and 6 I show a multiplication of filtering vessels A and wells F and an aerator D at the terminal of the series. In Figs. 7 and 8 I show a multiplication of filtering vessels, each provided with its own supply-pipe, whereby while one vessel may be closed and so cut off the others may be in service, thus continuing the filtration. In said Figs. 7 and 8 the aerators D are shown as existing between opposite vessels and having a gutter D', which leads to the storage basin or reservoir A'. In Fig. 9 the filtering vessel A is removed from the aerator, but connected therewith by a pipe A³, which leads to the well A⁴, the latter being within the aerator. In the said Figs. 5, 6, 7, 8, and 9 the vessel A is provided with pipes H and J, respectively at the bottom and side thereof, for discharge or emptying and cleansing purposes, as in the other figures.

It is apparent that the walls of the vessel A and the aerator D being properly separated form the space comprising the well F, and as a matter of economy, strength, and practicability said walls may be formed of blocks of hydraulic cement or other waterproof material or any approved masonry or built up from such cement or material, avoiding the employment of metal casings, which rust, clog, and break.

The top of the well may be covered by a hood (shown in dotted lines, Fig. 1) to prevent exposure of the water in said well to dust, freezing, &c.

Having thus described my invention, what I claim as new, and desire to secure by Letters Patent, is—

1. In a filter, a vessel with a filtering-bed therein, an inlet at top, a discharge-opening at bottom, a well for filtered water adjacent to said vessel and in communication with the same at said opening, and an aerator for filtered water extending from the top of said well to a storage-basin.

2. In a filter, a storage basin or reservoir, a filtering vessel and a water-aerating device rising therefrom and a well intermediate of said vessel and device.

3. In a filter, a storage basin or reservoir, a filtering vessel and a water-aerating device, and a well intermediate of said vessel and device, the walls of said vessel and device being common to said well.

4. In a filter, a storage basin or reservoir, a filtering vessel, a water-aerating device, a well intermediate of said vessel and device, and a discharge-pipe communicating with the base of said vessel and well.

5. In a filter, a filtering vessel and a discharge-pipe at the side thereof communicating therewith for the removal of deposits and the material of the filter-bed.

6. In a filter, a storage basin or reservoir, a filtering vessel, a water-aerating device, a well intermediate of said vessel and device, a discharge-pipe communicating with the base of said vessel and well, and an emptying-pipe at the side of said vessel in communication with the interior of the latter at the place where the deposits collect and adjacent portion of the filter-bed is seated.

7. In a filter, a filtering-chamber adapted primarily for the downward flow of water in unfiltered condition, a well in communication with said chamber adapted for the upward flow of the water when filtered, and an aerating device extending from the discharge portion of said well.

8. In a filter, a filtering-chamber, and a well in connection therewith, said well having its discharge at the top, in combination with a pipe near the base of the filtering-chamber for the discharge of the filtering material, and a pipe at the base of said well for the discharge of the contents thereof, both for cleansing purposes.

9. In a filter, a filtering-chamber open at top, a guard on the wall of said top around the opening thereof, and a bridge leading to said wall.

JOHN A. WIEDERSHEIM.

Witnesses:
L. DOUVILLE,
P. F. NAGLE.